United States Patent [19]

Wentworth

[11] 4,364,984
[45] Dec. 21, 1982

[54] SURFACED ORIENTED STRAND BOARD

[75] Inventor: Irvin Wentworth, Menlo Park, Calif.

[73] Assignee: Bison-Werke, Bahre & Greten GmbH & Co., KG, Springe, Fed. Rep. of Germany

[21] Appl. No.: 227,797

[22] Filed: Jan. 23, 1981

[51] Int. Cl.³ .................... B32B 5/12; D04H 1/16
[52] U.S. Cl. .................................. 428/106; 264/113;
428/114; 428/212
[58] Field of Search .................... 428/106, 114, 212;
264/113

[56] References Cited

U.S. PATENT DOCUMENTS

| | | | |
|---|---|---|---|
| 2,979,105 | 4/1961 | Burkner | 425/81.1 |
| 3,098,781 | 7/1963 | Gretin | 264/113 |
| 3,164,511 | 1/1965 | Elmendorf | 428/106 |
| 3,171,872 | 3/1965 | Jarrett et al. | 264/113 |
| 3,846,219 | 11/1974 | Kunz | 156/279 |
| 4,035,120 | 7/1977 | Eriksson | 264/113 |
| 4,045,528 | 8/1977 | Urmanov | 264/113 |
| 4,063,858 | 12/1977 | Axer et al. | 425/1 |
| 4,068,991 | 1/1978 | Ufermann et al. | 264/113 |
| 4,122,236 | 10/1978 | Holman | 428/453 |
| 4,210,692 | 7/1980 | Bohme et al. | 428/106 |

OTHER PUBLICATIONS

Bisonsystem, Bison-OSB-Plants, May, 1979.

*Primary Examiner*—William R. Dixon, Jr.
*Attorney, Agent, or Firm*—C. Michael Zimmerman; Ralph L. Mossino

[57] ABSTRACT

Wood particles are distributed in selected patterns and bonded together by an adhesive to form a multilayer wood particleboard. The board has a central core of three layers of wood strands sandwiched between two outer surface-forming layers of fine wood particles. The wood strands forming the central core have a length which is several times greater than their width, with their fiber elements substantially parallel to their length. The fine wood particles are irregularly contoured wood particles having a width and thickness less than the average width of the strands forming the central core layers. Each of the three central core layers has its wood strands distributed in a parallel orientation pattern, with the strands in the outer two layers of the core parallel and the strands of the center layer perpendicular to those of the outer two layers to form a layer-to-layer cross-oriented strand pattern. Both surface-forming layers are composed of fine wood particles of various sizes distributed in an unoriented graduated size pattern from the outer surface to the central core, with the progressively smaller or finer wood particles closer to the outer surface of the surface layers. The multilayer wood particleboard is made by forming a multilayer mat of adhesive coated wood particles, with each layer having the wood particle and pattern characteristics described above, and then compressing the adhesive coated wood particles forming the multilayer mat in a hot platen press.

8 Claims, 4 Drawing Figures

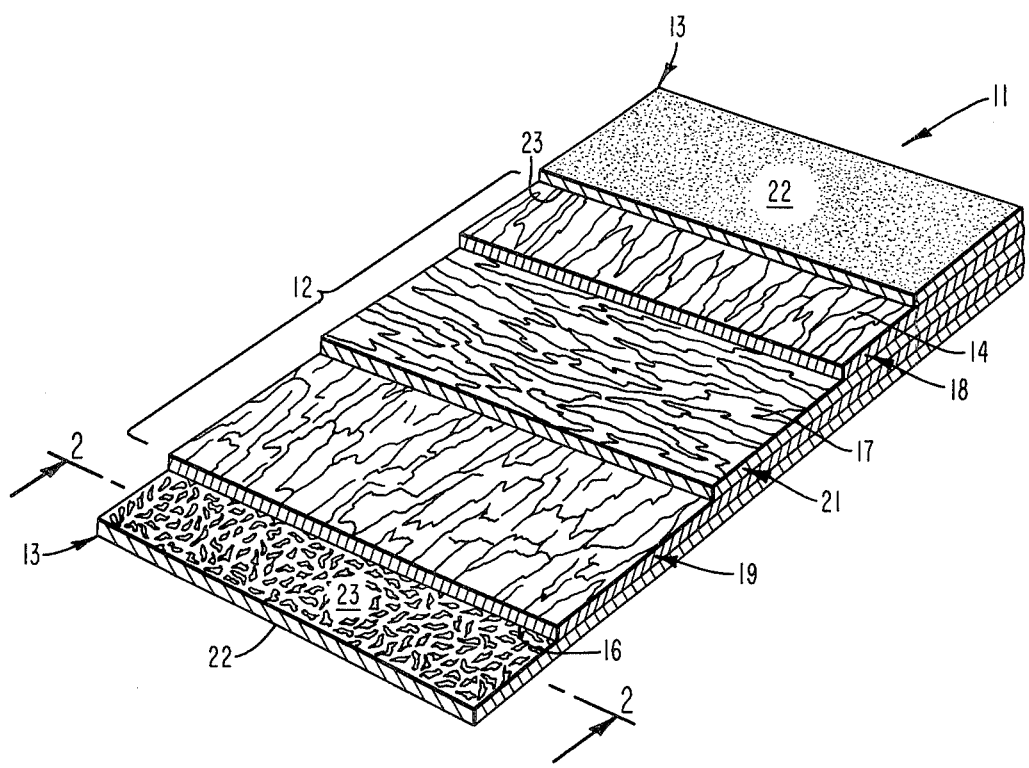
FIG_1
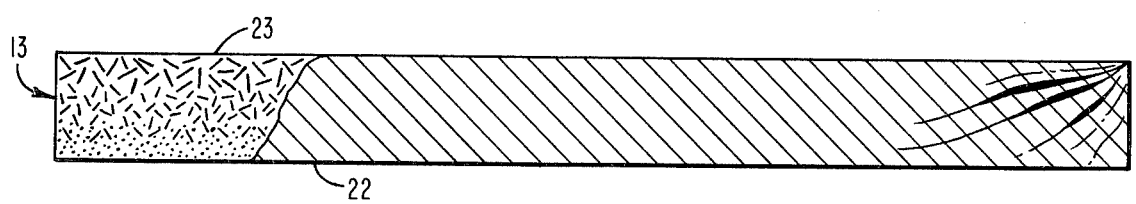
FIG_2

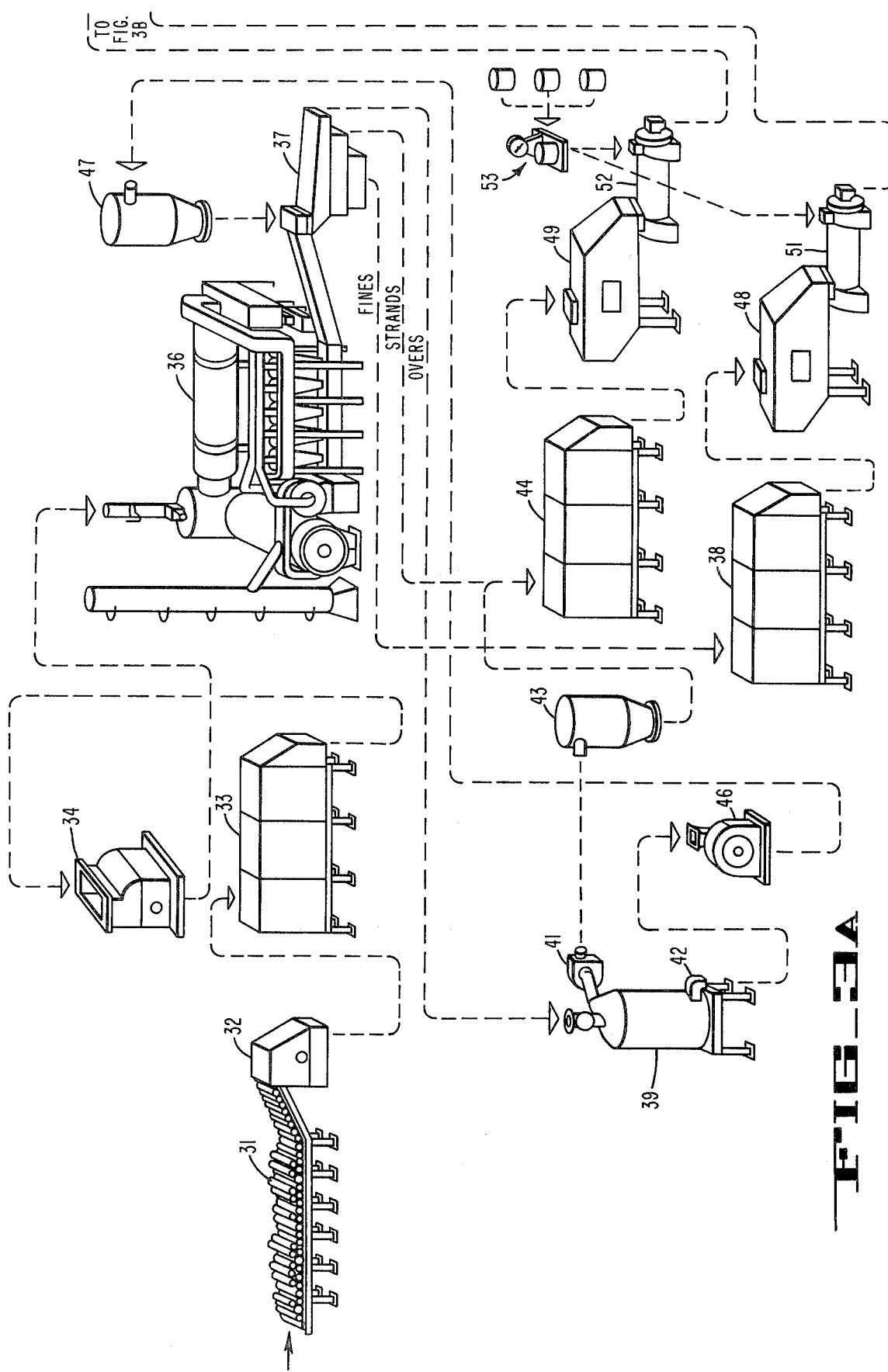
FIG_3A

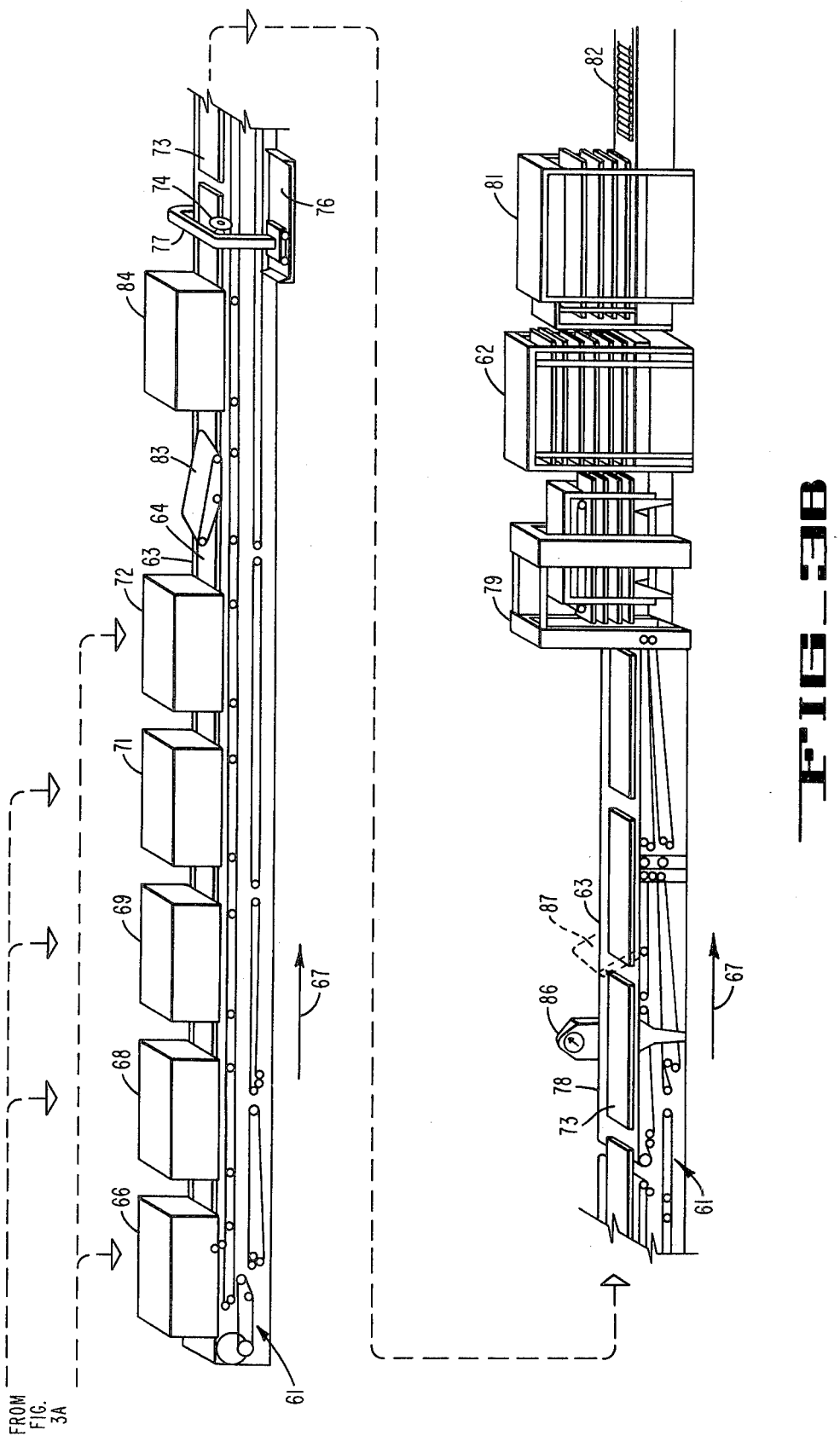

SURFACED ORIENTED STRAND BOARD

The present invention relates to wood composition boards manufactured from wood particles bonded together by an adhesive and, more particularly, to such wood composition boards having a multilayer structure.

Rising demand for wood products and depletion of virgin forests has led to the search for more efficient use of harvested timber and to the development of alternatives to natural solid wood lumber products. First, plywood and, more recently, wood composition fiberboard and particleboard were found to be acceptable alternatives, usually, to natural wood paneling, sheathing and decking lumber. Fiberboard and particleboard lumber are built-up from wood particles bonded together by an adhesive, the adhesive being selected according to the intended use of and the properties desired for the lumber. Often times, the adhesive is combined with other additives to impart additional properties to the lumber. Common additives are fire retardants, insect repellants, moisture resistants, fungus resistants and color dyes. In some fiberboard and particleboard lumber products, wood particles have been combined with other cellulosic materials, such as vegetable fibers, pulp and the like. A significant advantage of fiberboard and particleboard lumber products is that they have many of the properties of plywood, but can be made from lower grade wood species and waste from other wood product production, and can be formed into lumber in lengths and widths independent of size of the harvested timber.

The principal goal in producing alternatives to natural solid wood lumber is achieving properties like those of the equivalent natural solid wood lumber, especially, the properties of retaining strength, durability, stability and finish under exposure to expected environmental and use conditions. For versatility of producing lumber of various combinations of widths and thicknesses, multilayer oriented strand wood particleboards with a layer-to-layer cross-oriented strand pattern have proven best able to match the properties of the equivalent sized natural wood board. Cross-oriented, multilayer wood strand boards are composed of several layers of thin wood strands, which are wood particles having a length which is several times greater than their width and are formed by slicing larger wood pieces so that the fiber elements in the strands are substantially parallel to the strand length. The strands in each layer are positioned relative to each other with their length in substantial parallel orientation and extending in a direction approaching a line which is parallel to one edge of the layer. The layers are positioned relative to each other with the oriented strands of adjacent layers perpendicular, forming a layer-to-layer cross-oriented strand pattern. Cross-oriented, multilayer wood strand boards of the above-described type are described in detail in U.S. Pat. No. 3,164,511.

Presently, cross-oriented, multilayer wood strand boards of the above-described type are produced with bending, tensile strengths and face strengths comparable to those of commercial softwood plywood. However, the elongated wood strands forming oriented wood strand boards typically have an irregular contour and, as a result, form a rough surface finish. Even sanding the board surface and/or including very small wood particles or "fines" (typically, wood particles having a width and thickness less than 0.50 mm) to fill the voids created by the irregularly contoured wood strands has not resulted in producing smooth surface finishes on oriented wood strand boards comparable to those routinely produced on natural solid wood boards. To form a smooth surface on oriented wood strand boards, it has been suggested to place a layer of wood particle fines on the finish surface of the board. Unfortunately, the small, irregular contour of the fines does not, on the average, provide sufficient surface area for contacting and forming strong bonds with the relatively larger oriented wood strands forming the outer surface of the oriented wood strand board. Consequently, where smooth or decorative surface finishes have been desired in wood constructions, builders have resorted to using either natural solid wood, oriented strand wood composition boards covered with a lamina of plastic or other equivalent surface finish material, plywood or fiberboard. While plywood and fiberboard wood composition boards have proven satisfactory for use as decking, exterior and interior wall paneling and other applications where wide and relatively thin boards are required, such wood composition boards have not been suited for use where thick boards, beams and the like are required. Fiberboard and plywood structures do not have the strength properties usually required of such structural bodies.

Accordingly, many advantages will be realized by providing a wood composition board having the strength, durability and stability properties of cross-oriented, multilayer wood strand boards together with the finish properties of fiberboard and plywood boards. The ability to produce wood composition boards having the above-described combined properties enhances the efficient use of harvested timber because new and increased use is made of wood composition boards made from lower grade wood species and waste from other wood product production. New use of wood composition boards in the production of thick boards, beams and like wood products also serves to conserve large timber forest sources, since less of the aforementioned wood products will be produced in natural solid wood form.

In accordance with the present invention, a multilayer wood particleboard is manufactured to have a core portion of at least two layers composed substantially of adhesively bonded wood strands, and at least one layer composed substantially of adhesively bonded wood fines bonded to cover an outer layer of the core portion to form a finished surface. The wood strands are distributed in each core layer with their length in substantial parallel orientation in a preferred direction. Furthermore, the adjacent layers of the core are positioned relative to each other with the oriented strands of each layer perpendicular to the oriented strands of the adjacent layer, to thereby form a layer-to-layer cross-oriented strand pattern multilayer core structure. Wood strands having the average dimensions given above and discussed in further detail in the aforementioned U.S. Pat. No. 3,164,511 are suitable for use in forming the core portion of the multilayer wood particleboard of the present invention.

The layer of fines is composed of irregularly contoured wood particles of various sizes having a width and thickness considerably less than average width of the wood strands forming the core layers. As discussed hereinabove, fines typically are defined as wood particles having a width and thickness less than 0.50 mm. However, with respect to the present invention, the term "fines" is used in the broader, more generically relative sense to define wood particles having an average width and thickness several times smaller than the average width of the wood strands used to form the associated core layers. In any event, the fine wood particles are distributed in an unoriented graduated size pattern from the outer surface to inner surface of the core-covering surface layer, with the progressively smaller or finer wood particles being distributed closer to the outer surface of the surface layer. With the fines distributed in this unoriented, graduated size pattern, the largest fine wood particles are in contact with the surface of the covered core layer of the multilayer board to provide more contacting surface area for bonding the surface layer of fines to the covered core layer. By increasing the surface area of contact at the interface between the covered core layer and surface layer, a much stronger bond is capable of being formed between the layers. By avoiding orientation of the fine wood particles, the particles interlink to aid the adhesive in the creation of a strong bond between the fines forming the surface layer.

By combining the unoriented, graduated size pattern of distribution of fines in the surface layers with the layer-to-layer cross-oriented strand pattern of distribution of strands in the core layers of the multilayer wood particleboard structure, the strength, durability, stability and finish properties typifying natural solid wood lumber can be produced in lumber made from such multilayer wood particleboard structures.

Any of the known adhesives used in forming wood particleboards can be used in the production of the multilayer wood particleboard of the present invention. The particular adhesive or adhesives selected will be determined by the intended use of and desired properties for the resulting product, as commonly done in the past. The construction of the multilayer wood particleboard of the present invention also permits the use of common additives, such as fire retardants, insect repellants, color dyes, etc., to impart additional properties to the resulting products. Also, other cellulosic materials can be used to supplement the more desirable wood particles for economy reasons, if the concomitant change in the properties of the resulting product is acceptable.

The strength, durability, stability and finish properties characteristic of natural solid wood products are best achieved by a core construction of three or greater odd number of layers of oriented wood strands, with layers arranged in a layer-to-layer cross-oriented strand pattern. Furthermore, expansion and contraction, i.e., creep, in the principal plane of the multilayer wood particleboard of the present invention can be made essentially uniform throughout the thickness of the board by a board construction that is structurally symmetrical about its center plane lying perpendicular to the board's thickness dimension. These properties are achievable by a multilayer wood particleboard construction having a central core portion including at least three or greater odd number of layers of oriented wood strands, with the layers arranged in a layer-to-layer cross-oriented strand pattern. A surface layer of fines is placed over each outer layer of the central core portion, with the fine wood particles forming each surface layer distributed in an unoriented, graduated size pattern, from the outer surface to the central core as described hereinabove.

To facilitate the formation of strong bonds between the wood particles forming each one of the multilayers and between the several layers themselves, it is preferred to make the multilayer wood particleboard of the present invention by first forming a multilayer mat of adhesive coated wood particles, with each layer having wood particles of the kind and distributed in a pattern as described above. It may be desirable to prepress the mat during the formation of the multilayer structure before the last surface layer is formed. In such cases, the necessary apparatus is provided following each layer formation station where prepressing is desired. Following the formation of the multilayer, loosely felted mat, the mat of adhesive coated wood particles is compressed under a selected combination of temperature and pressure conditions in a press to activate and effect curing of the adhesive, whereby the wood particles forming each layer and the various layers are bonded together to form an integral, highly compacted multilayer wood particleboard mat having properties like a board cut from natural wood. After curing, the multilayer particleboard can be conveyed to cutting, trimming and surfacing equipment for forming into selected pre-cut lumber sizes with desired finishes.

Accordingly, it is an object of the present invention to provide lumber products produced from adhesively bonded wood particles that have strength, durability, stability and finish properties like those of the equivalent lumber products cut to size from natural solid wood.

More particularly, it is an object of the present invention to provide a wood particleboard body construction that enables the production of wood particleboard lumber products of various selected combinations of widths, lengths and thicknesses.

A further object of the present invention is to provide such wood particleboard lumber products having exterior surface properties permitting the formation of surface finishes like that possible with lumber products cut to size from natural solid wood.

Another object of the present invention is to provide wood particleboard lumber products having such surface finishes and yet of a construction that includes multiple layers of oriented wood strands with such layers arranged in a layer-to-layer cross-oriented strand pattern.

It is a further object of the present invention to provide a wood particleboard body construction that makes efficient use of harvested timber.

It is still another object of the present invention to provide a wood particleboard body construction that permits use of low grade wood species and waste from other wood product production while retaining the ability to meet the various objects described above.

Yet, it is another object of the present invention to provide a wood particleboard body construction meeting the various objects described above that can be produced through the use of presently available good particleboard manufacturing equipment.

The foregoing and other objects, features and advantages of the present invention will become more apparent upon consideration of the following description and claims taken in conjunction with the accompanying drawings, which illustrate one preferred embodiment of the present invention and wherein:

FIG. 1 is a perspective view of a portion of an embodiment of the multilayer wood particleboard of the present invention;

FIG. 2 is a cross-sectional view taken along line 2—2 of a portion of the board illustrated in FIG. 1; and FIGS. 3A and 3B together comprise a schematic representation of one arrangement of equipment suitable for producing the multilayer wood particleboard illustrated in FIG. 1.

FIG. 1 illustrates a portion, indicated generally by reference number 11, of a five-layer embodiment of the multilayer wood particleboard of the present invention having a three-layer core portion 12 and two identical surface layers 13, one covering each of the opposite top and bottom surfaces 14 and 16 of the core portion 12. Furthermore, the embodiment illustrated is a long rectangular board configuration commonly used for finish-grade lumber. However, as should be readily apparent from the entire description of the present invention, the illustrated number of layers and configuration of the multilayer wood particleboard is merely exemplary and can be varied without departing from the scope of the present invention. Also, to facilitate illustrating the wood sizes and distribution patterns in the various layers, one end of the particleboard illustrated in FIG. 1 has been feathered and the sizes of the wood particles have been exaggerated in the FIGS. 1 and 2, with the particle size in the various layers somewhat enlarged.

As illustrated in FIG. 1, each core layer 12 is composed substantially of thin wood strands 17, which have a length several times greater than their width and which are produced so that their fiber elements are substantially parallel to their length. While the wood strands are generally straight, they have an irregular contour. The strands 17 are distributed in each layer relative to each other with their length in substantial parallel orientation and extending in a direction approaching a line which is parallel to one edge of the layer. The configuration and distribution of wood strands 17 suited for the construction of core layers 12 for the multilayer wood particleboard of the present invention are described in detail in U.S. Pat. No. 3,164,511. The wood strands should have a length in the range of about 12 mm to 150 mm, a width in the range of about 2.0 mm to 20.0 mm and a thickness in the range of about 0.2 mm to 0.6 mm. The wood strand layer can include wood particles having dimensions outside the above-specified ranges and usually includes a significant amount of wood particle fines as fill for voids that would otherwise exist in the layer because of the irregular contour of the strands. The core layers 12 can include up to about 20%, on an oven dry weight basis, wood particle fines without degrading the strength, durability and stability properties of the particleboard 11.

With respect to the parallel orientation of the strands 17, FIG. 1 shows strands crossing one another in a woven fabric-like pattern while having a mean direction parallel to one edge of the layer. In accordance with the present invention, parallel orientation is used to define a distribution of wood strands in which the average acute angle between crossing strands is less than about 40° and the mean direction of the strands is parallel to one edge of the layer.

The three layers of the core portion 12 are arranged in a layer-to-layer cross-oriented strand pattern. In other words, the top and bottom outer core layers 18 and 19 are formed to have their strands 17 parallel and the central core layer 21 is formed to have its strands 17 perpendicular to those forming the outer core layers. The multilayer core portion 12 can be formed of any number of two or more layers. However, superior strength, durability and stability properties are achieved by a multilayer core construction of three or a greater odd number of layers of oriented wood strands arranged in a layer-to-layer cross-oriented strand pattern. In addition, improved bending and tensile strengths are obtained by orienting the strands in a multilayer core composed of an odd number of layers so that the strands in the outer two layers have their lengths extending in the direction of the length dimension of the particleboard 11 and the strands of inner layers cross-oriented to form the desired layer-to-layer cross-oriented strand pattern.

Preferably, both the top and bottom surfaces 14 and 16 of the core portion 12 are covered by a surface layer 13, composed substantially of wood particle fines distributed in a particular unoriented graduated size pattern. The fines are composed of irregularly contoured wood particles having width and thickness considerably less than the average width of the wood strands forming the core layers. Such wood particle fines may be in the form of short elongated particles, pellet shaped particles and/or long, thin wood fiber particles. For constructing multilayer particleboards having core layers formed by wood strands having average dimensions in the above-specified ranges, fines having a width and thickness less than an upper limit of about 0.50 mm are used to form the two surface layers 13. The surface layers can include up to about 30%, on an oven dry weight basis, oversized wood particles having widths and/or thicknesses greater than the above-specified upper limit without impairing the ability to form a smooth surface finish, particularly, if the oversized wood particles are confined to a region of the surface layers at or near the adjacent outer core layers 18 and 19, respectively.

As shown in FIG. 2, the wood particle fines are distributed throughout each surface layer 13 in an unoriented graduated size pattern from its exposed outer surface 22 to its inner surface 23. The graduated size distribution is formed with progressively smaller or finer wood particles closer to the outer surface 23 of each of the surface layers 13. With fines of larger width and thickness concentrated in each of the surface layers 13 in regions at or near the contacting surfaces 14 and 16 of each of the adjacent core layers 18 and 19, respectively, a large effective surface area of contact is established between the surface layers 13 and core layers 18 and 19. When forming a multilayer particleboard having adhesive coated wood particles distributed in the surface and core layers as described above, the large effective surface area of contact between the surface and core layers results in the establishment of a strong bond between the adhesive coated large wood fines of the surface layers 13 and the juxtaposed adhesive coated wood strands of the outer core layers 18 and 19. Furthermore, the unoriented adhesive coated fines are interlinked throughout the surface layers 13 to form a woven, fiber-like irregular pattern that aids the adhesive in creating a strong bond between the fines of the surface layers.

As a result of the graduated size distribution of the fines forming the surface layers 13, the exposed outer surfaces 22 are formed by densely packed wood particles having insignificant, if any, voids between them. Consequently, a smooth surface finish can be formed on the exposed outer surfaces comparable to finishes achievable on surfaces of natural solid wood. In many wood product applications, decorative finishes other than smooth surface finishes are desired. For example, the formed multilayer particleboard can be further processed to create mechanically a simulated wood grain finish on its exposed outer surfaces 22. Furthermore, the ability to form a smooth finish on the exposed surfaces enables the multilayer particleboard of the present invention to be used as a substrate for decorative overlays, such as clear films, printed papers, foils and the like. Substrates with rough finishes can form impressions in such overlays that detract from their decorative effect.

The construction of the multilayer wood particleboard of the present invention permits the use of various special property-imparting additives and supplementing cellulosic materials other than wood. If it is desired to render the resulting product more resistant to fire, insects, moisture, fungus or other wood deteriorating causes or to add a selected color tone to the resulting product, a suitable common additive is mixed with the adhesive to be used in the formation of the treated layer or layers. Supplementing cellulosic materials other than wood and even non-cellulosic materials, such as fiber glass or mica, can be used to the extent that any concomitant change in the properties of the resulting product is acceptable. The size and distribution of the supplementary materials will be the same as described previously with reference to FIGS. 1 and 2.

While it is preferred to construct the multilayer particleboard of the present invention with an odd number of five or more odd number layers, with the two outer surface layers 13 composed of fines, as described above with reference to FIGS. 1 and 2, in some applications it may be acceptable to omit one of the surface layers 13. With two surface layers 13, a multilayer particleboard 11 can be formed that is symmetrical about center core layer 21. This symmetry reduces differential creep across the thickness dimension of the particleboard 11. Creep in lumber ordinarily is induced by changes in the moisture content of the surrounding environment to which the lumber is exposed. In applications where only one surface of the multilayer particleboard 11 is exposed to the surrounding environment or where the moisture content of the surrounding environment remains relatively constant, differential creep is not likely to occur. For such applications, one of the surface layers 13 can be omitted from the multilayer particleboard 11, if only one finish surface is needed.

The multilayer particleboard 11 of the present invention can be formed into finished lumber of various selected length, width and thickness combinations. Because of the multilayer construction of the particleboard 11, finished lumber having the various advantageous features described above can not be made practically with a thickness less than about 6.35 mm. However, finished lumber of any combination of greater thickness, width and length can be produced. Many variations of layer thickness may be selected for constructing an embodiment of the multilayer particleboard 11. Generally, however, the thickness of each finished surface layer must be at least about 1 mm to avoid print-through during the formation of the particleboard 11. If the surface layers are thinner than about 1 mm, the irregular surface of the underlying layer of wood strands will form impressions in the thin surface layer, i.e., will print-through during the pressing of the loosely felted multilayer mat of wood particles. On the other hand, the combined thickness of all finished surface layers should not exceed 25% of the total thickness of the finished multilayer particleboard 11, unless a significant reduction in the strength of the particleboard is acceptable.

Various processes and equipment can be employed to produce the multilayer particleboard of the present invention, although some limitations may be imposed on the process and/or equipment selection by the desired size of the finished particleboard, the number of layers forming the particleboard and the intended use of the finished particleboard. FIGS. 3A and 3B together illustrate one arrangement of equipment suitable for producing the 5-layer particleboard embodiment illustrated in FIGS. 1 and 2. An important advantage of the present invention is the ability to use presently known equipment arranged in a manner that forms the desired distribution of wood particles in the various layers and arrangement of layers so that the aforedescribed graduated size pattern and layer-to-layer cross-oriented strand pattern are established in the surface layers 13 and core layers 12, respectively.

Generally, the multilayer particleboard 11 is produced by first depositing adhesive coated fine wood particles on a substrate to form a first loosely felted surface layer of wood particles having the particle orientation and graduated size distribution characteristics described above with reference to FIGS. 1 and 2. Then, the three core layers of adhesive coated strands are successively deposited to rest on the first surface layer to form a three-layer loosely felted core portion of wood particles having the strand orientation and layer-to-layer cross-oriented strand pattern characteristics described above with reference to FIGS. 1 and 2. Lastly, a second loosely felted surface layer of wood particles is formed by depositing adhesive coated wood fines over the core portion in an orientation and graduated size distribution described above with reference to FIGS. 1 and 2. The five deposited layers form a loosely felted multilayer mat that is compressed under a selected combination of temperature and pressure conditions to effect compacting and bonding of the adhesive coated wood particles, whereby an integral highly compacted five-layer particleboard body is formed. As is common practice in the manufacture of multilayer wood composition board structures, the five-layer particleboard is formed on a conveyed substrate by depositing each loosely felted layer of the particleboard and compressing the formed loosely felted layers at successive stations along the path traveled by a conveyed substrate.

The adhesive/wood particle admixtures from which the surface layers of fines and the core layers of strands are formed must be prepared carefully in order to produce multilayer particleboards of the present invention with above-described desirable properties. FIG. 3A illustrates one equipment arrangement for preparing such admixtures from bulk wood.

With reference to FIG. 3A, wood particles used in forming the various layers are produced from logs 31. A knife drum flaker 32 slices the logs so that elongated wood flakes are produced having their fiber elements parallel to the length of the flakes. A suitable knife drum flaker is marketed by Bison-Werke Bahre and Greten GmbH & Co. K. G. of Springe, West Germany (hereinafter called "Bison") under the model designation ZST. The flakes of wood particles produced by the knife drum flaker 32 may be stored in a storage bin 33 until needed or conveyed directly to a hammer mill 34, which further splits the flakes into smaller wood strands of a desired average width and length. A suitable hammer mill available from Bison is identified by the model designation 02/812. A storage bin 33 having a metering device for feeding the hammer mill 34 at a selected feed rate is offered by Bison under the model designation BB-200.

A proper admixture of wood particles and adhesive used to form the various layers of a particular multilayer particleboard 11 has unvarying, predictable parts of wood particles, adhesive and moisture. Wood strands produced from logs 31, or obtained from other sources, such as waste products of other wood production processes, usually have a high moisture content that varies over a wide range. Consequently, the wet wood particle products produced by the hammer mill 34 are passed through a wood particle drying apparatus 36, which is operated so that the wood particle products emerge therefrom with a substantially uniform moisture content of about 4%, on an oven dry weight basis. A suitable wood particle drying apparatus available from Bison is marketed under the name "Bison Single Pass Dryer", type 100/5.

After drying, the dried wood particles are separated into three fractions, two of which are used to form the layers of the multilayer particleboard 11. The third fraction contains oversized particles that are unsuitable for use in forming the layers and, therefore, are refined further, as described below, to form usable particles. In the arrangement of equipment illustrated in FIG. 3A, the dried wood particles are first passed through a screen-type particle separator 37. The particle separator is designed to classify and separate the dried wood particles into three fractions; fines, acceptable strands (referred to herein as "strands"), and oversized particles (referred to herein as "overs"). A suitable screen type particle separator is marketed by Bison under the model designation ARSM 333.

The fines are conveyed directly to a belt storage bin 38, which may be of the kind described above for storing wet wood flakes produced by the knife drum flaker 32. The strand fraction is conveyed directly to a belt storage bin 44, which may be of the kind described above for storing wet wood flakes produced by the knife drum flaker 32. The overs fraction produced by the screen-type separator 37 contains oversize strands as well as acceptable size strands. Consequently, the overs fraction is conveyed to a further particle separator 39, preferably an air classifying type subjecting the wood particles to a cascaded two-stage screening process. Air classifying particle separators commonly have one or more accept outlets 41 and one reject outlet 42. The illustrated air classifying separator 39 has a single accept outlet 41 and it is arranged and operated so that substantially all oversized wood strands are discharged through the reject outlet 42. Thus, the discharge of the accept outlet will primarily include wood strands of an acceptable size. A suitable air classifier type wood particle separator is marketed by Bison under the model designation RR 4-0. It should be noted that the above-described particle separating devices are of the kind that permit their discharges to be controlled so that, if desired, the fine discharge can include a controlled portion of larger wood particles and the strand discharge can include a controlled portion of fines.

With respect to the wood strand mixture provided by the air classifying particle separator 39, they are conveyed through a conventional cyclone 43 to the belt storage bin 44. The fine and strand fractions are stored in their respective bins 38 and 44 until needed for forming the multilayer particleboard 11. The cyclone 43 serves to dispel the air flow formed by the air classifying particle separator 39 that entrains the acceptable strands, and discharge the strands into the discharge bin 44.

Considering the rejected oversized wood particles discharged at the reject outlet 42 of the air classifying particle separator 39, they are conveyed to a knife ring flaker 46 and following conventional cyclone 47 for refining into smaller wood particles in the acceptable size range of fines and strands. The refined wood particles are introduced into the screen-type particle separator 37 whereby they undergo the cascaded two-stage screening process described above. A suitable knife ring flaker is marketed by Bison under the model designation PZK-R.

As wood particle fines and strands are needed to form multilayer particleboards 11, they are transferred from their respective bins 38 and 44 to metering bins 48 and 49 operatively associated with blenders 51 and 52. Each metering bin serves to discharge wood particles into its operatively associated blender at a controllably constant rate of feed. Each blender also is arranged to receive adhesive (and other additives, if desired) at a controlled feed rate. The blenders thoroughly mix the received components to form adhesive/wood particle admixtures. The component feed rates are controlled to produce the adhesive-to-wood particle ratios desired for the admixtures. Adhesive is dispensed to each of the blenders 51 and 52 by a conventional resin mixer 53. The resin mixer 53 serves to mix the individual components forming the adhesive, and other additives when used, and meter the required quantity of adhesive to the blender. Any of the resins and associated components used to make adhesives for forming common wood particleboards can be used to make the adhesive for forming the multilayer wood particleboard of the present invention. While different adhesive-to-wood particle ratios may be used in the fine and strand admixtures (usually, a lower adhesive-to-wood particle ratio is preferred for admixtures of fines), mixers are available that can simultaneously dispense adhesive at different feed rates. In any event, a variety of adhesives may be used to form the fine and strand admixtures, and the admixtures can be formed to have any of a wide range of adhesive-to-wood particle ratios. For example, urea formaldehyde, phenol formaldehyde, melamine modified urea or di-isocyanate resin based adhesives, or combinations of them, can be used to form the admixtures. The type of adhesive and the adhesive-to-wood particle ratio selected for the fine and strand admixtures usually is determined by the intended use of the end product, the properties desired for the end product, and the process selected to form the multilayer particleboard 11. Phenol formaldehyde resin based adhesives can be used in the production of multilayer particleboards intended for most end-product uses. Including about 8% of such adhesive in the fine admixture and about 6% of such adhesive in the strand admixture produces satisfactory bonding. Preferably, the overall moisture content of the strand admixture is within the range of about 8 to 13% and while that of the fine admixture is within the range of about 8 to 20%, on an oven dry weight basis. If it is not convenient or possible to use a single resin mixer 53 to furnish the adhesives for both the fine and strand admixtures, separate resin mixers can be arranged to dispense the desired adhesive separately to the separate blenders 51 and 52 that produce the fine and strand admixtures, respectively.

Meter bin and blender combinations suitable for use in producing the wood particle/adhesive admixtures are marketed by Bison under the model designations Single Shaft for the fine meter fin and blender 48 and 51, and Double Shaft for the strand meter bin and blender 49 and 52.

The blended admixtures of adhesive coated fines and adhesive coated strands are conveyed to feeding bins associated with the wood particle distribution devices employed to form the loosely felted multilayer mat from which the multilayer particleboard of the present invention is produced. FIG. 3B illustrates an arrangement of equipment for forming the multilayer particleboard of the present invention, as generally described above. More specifically, a caul system 61 is employed to provide a conveyed substrate upon which the loosely felted multilayer mat is formed as it is being conveyed to a press 62 for compressing and bonding. In a caul system, a belt conveyor 63 carries cauls that serve as the conveyed substrate upon which the loosely felted multilayer mat 64 is formed.

The loosely felted five-layer mat is formed by five separate wood particle forming devices located at successive work stations along the path of the belt conveyor 63. The first of the five successive particle distribution devices is an air classifying and distribution apparatus 66 that distributes adhesive coated fines to form one of the above-described loosely felted surface layers, the fines being distributed in an unoriented graduated size pattern. The surface layer formed by the distribution apparatus 66 has its outer finish surface facing the conveyor belt 63, hence, the smaller or finer of the fines resting on the cauls and the progressively larger fines further from the cauls, covering smaller fines. To achieve this distribution, the distribution apparatus 66 must be arranged so that smaller fines of the admixture of fines are deposited first. Since the conveyed cauls move in the direction indicated by arrows 67, the classifying and distribution apparatus 66 is arranged to separate the fines according to size and deposite the fines so that the smaller fines are deposited further upstream of the conveyor. As the conveyed cauls covered with smaller fines move downstream through the station of the distribution apparatus 66, the smaller fines are covered by larger fines that are deposited less far upstream than smaller fines. In this manner, the air classifying and distribution apparatus 66 forms the first of the two desired surface layers. A suitable classifying and distribution apparatus available from Bison is identified as model Air Graduated Former.

The loosely felted surface layer formed by the air classifying and distribution apparatus 66 then passes through three successive strand orienting and distribution stations, at which three layers of oriented strands are deposited on the surface layer to form the core portion of the multilayer particleboard. At the first of the three successive stations, an in-line mechanical strand orienting and distribution apparatus 68 deposits a first outer core layer of strands on the previously formed surface layer, with the strands in substantial parallel orientation and having their length extending in a mean direction that approaches the direction of travel of the conveyor belt 63. A transverse mechanical strand orienting and distribution apparatus 69 is located at the second of the three successive stations to form a central core layer of strands on the previously formed first outer core layer. This strand orienting and distribution apparatus is also arranged to deposit the strands in substantial parallel orientation, but with their length extending in a mean direction that approaches a line perpendicular to the travel of the conveyor belt 63, hence, perpendicular to the mean direction of extent of the lengths of the strands forming the first outer core layer. A second in-line mechanical strand orienting and distribution apparatus 71 is located at the third of the three successive stations and it forms a second outer core layer on the previously formed central core layer by depositing the strands in the same orientation as the first outer core layer. Thus, the three mechanical orienting and distribution apparatus produce a three-layer core structure characterized by a layer-to-layer cross-oriented strand pattern.

A mechanical strand orienting and distribution apparatus suited for use at all three of the successive stations is marketed by Bison under the model designation OFAL. In the illustrated arrangement of equipment for producing a five-layer particleboard embodiment of the present invention, the three core layers are produced from the same strand admixture. If it is desired that different core layers have different strand size ranges, it is only necessary to insert the appropriate screening and blending equipment in the admixture preparation system and make arrangements for conveying the various strand admixtures to the proper strand orienting and distribution apparatus. For example, the oversize strands discharged at the reject outlet 42 of the particle separator 39 could be processed to form a third strand/adhesive admixture for use by the strand orienting and distribution apparatus 69 to form the central core layer.

The four-layer mat of loosely felted adhesive coated wood particles next is conveyed under another air classifying and distribution apparatus 72, which forms the second surface layer on the second outer core layer. The apparatus 72 can be the same as the above-described air classifying and distribution apparatus 66. However, the air classifying and distribution apparatus 72 must be arranged to deposit the smaller fines further downstream of the conveyor in forming the second surface layer, because the second surface layer has its outer finish surface facing away from the conveyor belt 63. This necessitates depositing larger fines first followed by covering smaller fines, which is exactly the reverse of the size order in which fine particles are deposited by the classifying and distribution apparatus 66 in forming the first surface layer.

The mat leaving the station of the last particle distribution apparatus 72 is a fully formed five-layer continuous mat of loosely felted adhesive coated wood particles. To form the desired multilayer particleboard, the continuous mat is first cut into sections 73 of a convenient length for further handling and processing. A conventional mat crosscut saw 74 is mounted to be movable along a pair orthogonally positioned travels 76 and 77. The travels permit the saw 74 to be moved synchronously with the conveyed mat 64 as it cuts the mat so that there is no relative movement between the saw and mat in the direction of the travel of the mat.

A speed-up conveyor portion 78 of the conveyor system 61 serves to add separation between consecutive mat sections 73 and, thereby, facilitate their delivery to and loading in a conventional press loading cage 79 operatively associated with a typical multi-opening hot platen press 62. In the press 62, the mat sections 73 are subjected to the necessary pressure and temperature conditions to effect compressing of the mat and setting and curing of the adhesive, whereby an integral, highly compacted five-layer particleboard body is produced. A wide range of pressure and temperature combinations can be employed to form the particleboard. The press pressure and temperature conditions can be manipulated to either enhance certain properties or to obtain the best overall combination of properties in the produced particleboard. The particular temperature and pressure required to produce a desired set of properties in a multilayer particleboard of particular construction can be determined empirically. Temperatures up to 230° C. and pressures in the range of 35 to 50 kilopounds per square centimeter (kp/sqcm) can be used to form the five-layer particleboard embodiment of the present invention. Following completion of the press cycle, which requires 1 to 10 minutes depending upon the thickness and desired density of the finished mat sections 73, the formed particleboard sections are removed from the multi-opening press by a common press unloading cage 81 and are placed on a roller conveyor 82 for delivery to storage or further processing equipment. The additional processing equipment will typically include edge and end trim saws for forming straight edges and ends in the particleboard sections and cross-cut and rip saws for cutting the sections into desired pre-cut lumber sizes. In addition, the formed particleboard sections can be cut to obtain lumber having a single surface layer. This is accomplished by cutting the formed particleboard generally along its length-width plane. For example, by sawing the formed particleboard at a slight angle to its length-width plane, beveled siding lumber with a single surface layer can be produced. Hence, it will be appreciated that a wide variety of lumber can be produced from multilayer particleboards of the present invention.

While a particular arrangement of equipment has been described thus far for producing a particular multilayer particleboard embodiment of the present invention, other arrangements of equipment will also produce that and other embodiments of the present invention. For example, pre-compression press apparatus 83 and pre-heating RF heating apparatus 84 can be included in the particleboard production line, preferably, prior to the mat crosscut saw 74. The use of pre-compression and pre-heating apparatus reduces the overall pressing time required to form the multilayer particleboards, enhances the strength properties of the surface layers and the overall quality of the lumber products produced from the multilayer particleboards, and permits conveying the cut mat sections 73 with conveying systems other than a caul system. Also, mat weighing apparatus 86 and mat reject apparatus 87 can be included in the particleboard production line in front of the main press apparatus 62 to remove from the production line improperly formed mat sections 73, usually, detectable as an incorrect mat section weight. The removed or rejected mat sections can, for example, be conveyed by a swivel conveyor to a mat destruction device and the resulting material returned to the wet flake bin 33.

The equipment forming the multilayer particleboard production line are operated, preferably, through automatic control systems, to form multilayer particleboards having a selected finish density in the range of about 500 to 900 kilograms per cubic meter (Kg/m$^3$) and moisture content in the range of 5 to 9%, depending upon the intended use of the finished end products formed from the particleboards. The equipment also are controlled to impart other of the above-described properties, as may be desired. Whereas a particular embodiment of the multilayer particleboard of the present invention has been described and is illustrated in detail, such embodiment is only exemplary of the present invention. Variations and modifications are possible without departing from the spirit of the present invention. Therefore, it is not intended that the present invention be limited to the specific details enumerated in the foregoing description. As long as the selected multilayer particleboard embodiment of the present invention has at least two core layers, each of which is formed principally of parallel oriented wood strand particles, with the orientation direction of the strands in adjacent layers substantially perpendicular, and at least one surface layer covering one of the core layers, which is formed principally of fine wood particles distributed in a graduated size pattern with progressively finer particles closer to the exposed outer surface of the surface layer, many of the aforementioned advantages can be realized.

I claim:

1. A surfaced multilayer wood composition structure comprising:
    a multilayer core structure including first and at least second core layers, each core layer formed principally of adhesively bonded wood strands having an average length substantially greater than their average width, said wood strands have fiber elements extending generally parallel to the length of the strands and are oriented to define a selected mean length direction, said core layers adhesively bonded together with the selected mean length direction of the wood strands forming each core layer transverse to the selected mean length direction of the wood strands forming the adjacent core layer to which said each core layer is bonded; and
    a first surface layer formed principally of adhesively bonded wood fines having an average width and thickness less than the average width of the wood strands forming said core layers, some of said wood fines elongated, said wood fines distributed throughout said first surface layer in an unoriented graduated size pattern from a first surface to a second surface with the wood fines of progressively larger width and thickness closer to said first surface, said first surface layer adhesively bonded to an exposed surface of one of said core layers with its first surface including elongated wood fines against said exposed surface.

2. The surfaced multilayer wood composition structure of claim 1 further comprising a second surface layer formed principally of adhesively bonded wood fines having an average width and thickness less than the average width of the wood strands forming said core layers, some of said wood fines elongated, said wood fines distributed throughout said second surface layer in an unoriented graduated size pattern from a first surface to a second surface with the wood fines of progressively larger width and thickness closer to said first surface, said second surface layer adhesively bonded to an exposed surface of a core layer at a side of the multilayer core structure opposite that of said one core layer with its first surface including elongated wood fines against said exposed surface of said second surface.

3. The surfaced multilayer wood composition structure of claim 1 wherein the multilayer core structure includes an odd number of at least three stacked core layers.

4. The surfaced multilayer wood composition structure of claim 3 further comprising a second surface layer formed principally of adhesively bonded wood fines having an average width and thickness less than the average width of the wood strands forming said core layers, some of said wood fines elongated, said wood fines distributed throughout said second surface layer in unoriented graduated size pattern from a first surface to a second surface with the wood fines of progressively larger width and thickness closer to said first surface, said second surface layer adhesively bonded to an exposed surface of a core layer at a side of the multilayer core structure opposite that of said one core layer with its first surface including elongated wood fines against the exposed surface of said second surface.

5. The surfaced multilayer wood composition structure of claim 4 wherein all of the core layers are formed by wood strands having about the same average length, average width and average thickness.

6. The surfaced multilayer wood composition structure of claim 4 wherein said wood composition structure has a length greater than its width and thickness, and the wood strands in the outer core layers defining opposite sides of the multilayer core structure are oriented to define the selected mean length direction that approaches a line which is parallel to the length of said wood composition structure.

7. A surfaced multilayer wood composition structure comprising:
   a first outer core layer;
   a central core layer;
   a second outer core layer, each of said core layers formed principally of adhesively bonded wood strands having an average length substantially greater than their average width, said wood strands have fiber elements extending generally parallel to the length of the strands and are oriented to define a selected mean length direction, said core layers adhesively bonded together with the central core layer sandwiched between the first and second outer core layers and with the selected mean length direction of the wood strands forming each core layer transverse to the selected mean length direction of the wood strands forming the adjacent core layer to which said each core layer is bonded; and
   a first surface layer adhesively bonded to an exposed surface defined by the first core layer, said first surface layer formed principally of adhesively bonded wood fines having an average width and thickness less than the average width of the wood strands forming said first core layer to which said first surface layer is bonded, some of said wood fines elongated, said wood fines distributed throughout said first surface layer in an unoriented graduated size pattern from a first surface to a second surface with the wood fines of progressively larger width and thickness closer to said first surface, said first surface layer adhesively bonded to said first core layer with its first surface including elongated wood fines against said first core layer.

8. The surfaced multilayer wood composition structure of claim 7 further comprising
   a second surface layer adhesively bonded to an exposed surface defined by the second core layer opposite said exposed surface defined said first core layer, said second surface layer formed principally of adhesively bonded wood fines having an average width and thickness less than the average width of the wood strands forming said second core layer to which said second surface layer is bonded, some of said wood fines elongated, said wood fines distributed throughout said second surface layer in an unoriented graduated size pattern from a first surface to a second surface with the wood fines of progressively larger width and thickness closer to said first surface, said second surface layer adhesively bonded to said second core layer with its first surface including elongated wood fines against said second core layer.

* * * * *